US006322874B1

(12) United States Patent
Steelman et al.

(10) Patent No.: US 6,322,874 B1
(45) Date of Patent: Nov. 27, 2001

(54) ELECTROSTATIC TONER RECEPTOR LAYER OF RUBBER MODIFIED THERMOPLASTIC

(75) Inventors: Ronald S. Steelman, Woodbury, MN (US); Eric J. Hanson, Hudson, WI (US); Jennifer Jeannette, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 08/449,204

(22) Filed: May 24, 1995

Related U.S. Application Data

(62) Division of application No. 08/178,645, filed on Jan. 7, 1994, now abandoned.

(51) Int. Cl.[7] ..................... B32B 27/18

(52) U.S. Cl. ..................... 428/195; 428/204; 428/207; 428/354; 428/500; 428/522

(58) Field of Search ..................... 428/195, 201, 428/204, 206, 207, 343, 354, 411.1, 500, 522; 430/18, 126

(56) References Cited

U.S. PATENT DOCUMENTS

| | | | | |
|---|---|---|---|---|
| 3,065,120 | | 11/1962 | Avelar | 154/46.8 |
| 3,276,933 | | 10/1966 | Brant | 156/230 |
| 3,574,049 | | 4/1971 | Sander | 161/220 |
| 3,708,320 | | 1/1973 | Hurst et al. | 117/3.3 |
| 3,907,974 | | 9/1975 | Smith | 428/346 |
| 3,920,880 | * | 11/1975 | Akiyama et al. | 428/500 |
| 3,928,710 | | 12/1975 | Arnold et al. | 428/483 |
| 4,064,285 | * | 12/1977 | Mammino | 427/24 |
| 4,085,245 | * | 4/1978 | DeVito et al. | 428/215 |
| 4,737,224 | | 4/1988 | Fitzer et al. | 156/240 |
| 5,064,717 | * | 11/1991 | Suzuki et al. | 428/352 |
| 5,085,969 | | 2/1992 | Namiki et al. | 430/260 |
| 5,106,710 | | 4/1992 | Wang et al. | 430/42 |
| 5,114,520 | | 5/1992 | Wang, Jr. et al. | 156/240 |
| 5,202,205 | * | 4/1993 | Malhota | 430/17 |
| 5,246,910 | | 9/1993 | Koshizuka et al. | 503/227 |
| 5,254,403 | * | 10/1993 | Malhotra | 428/323 |
| 5,262,259 | | 11/1993 | Chou et al. | 430/47 |
| 5,330,823 | * | 7/1994 | Malhotra | 428/195 |
| 5,363,179 | * | 11/1994 | Cahill et al. | 355/278 |
| 5,488,455 | * | 1/1996 | Cahill et al. | 355/202 |

* cited by examiner

*Primary Examiner*—Marie Yamnitzky
(74) *Attorney, Agent, or Firm*—Carolyn V. Peters

(57) ABSTRACT

An electrostatic toner receptor layer comprised of a blend of an acrylic resin, a vinyl resin, a solution or dispersion grade rubber and a plasticizer. The resulting receptor layer provide durability and flexibility when applied to a crack resistance film for subsequent application to soft-sided vehicles.

6 Claims, No Drawings

ELECTROSTATIC TONER RECEPTOR LAYER OF RUBBER MODIFIED THERMOPLASTIC

This is a division of application Ser. No. 08/178,645 filed Jan. 7, 1994, now abandoned.

TECHNICAL FIELD

This invention is directed to an electrostatic toner receptor layer and more particularly to a receptor layer comprising a rubber modified thermoplastic.

BACKGROUND OF THE INVENTION

Previously, high quality graphics were limited to long runs to reduce cost or short runs, wherein the costs were excessive. With the advent of Scotchprint™ graphics, production of limited quantities of high quality graphics were readily affordable. Furthermore, Scotchcal™ 8620 and 8640 receptor-coated films have permitted the use of such high quality graphics for limited quantity applications for rigid surfaces. These marking films comprise a vinyl film base that is top coated with a solvent thermoplastic blend of acrylic copolymer, vinyl chloride/vinyl acetate copolymer, and a plasticizer. This top coating is a non-tacky solid that is moderately flexible at room temperature. Above 70° C., the thermoplastic melts and bonds onto electrostatic toners that were previously printed onto a transfer media. After cooling, the marking films can be separated from the transfer media and the toners are retained by the marking film.

Ideally, the thermoplastic layer (1) adheres well to the base film, (2) does not adhere to untoned (unimaged) areas on the transfer media, (3) does not destroy the physical properties of the base film (tensile, elongation, color, etc.), (4) bonds completely to the toners, permitting removal of toner from the transfer media and not permitting toner removal during normal application, (5) is not tacky during normal use, and (6) is compatible with additional operations, such as clear coating or premasking.

However, continuously flexed surfaces, such as the transports and vehicles with plasticized polyvinyl chloride coated fabric sides prevalent in a large portion of the world have proven to be a problem for the receptor-coated films. Typically, the plasticized polyvinyl chloride coated fabric is a thermoplastic material flexed, rolled, flapped, and cold-flexed numerous times during the lifetime of the siding. Hence, any graphic image adhered or otherwise attached to such a siding must be capable of withstanding identical stresses without failure.

SUMMARY OF THE INVENTION

Briefly, in one aspect of the present invention, the receptor layer comprises a blend of an acrylic resin, a vinyl resin, a solution or dispersion grade rubber, and a plasticizer coated on a crack resistant pressure sensitive adhesive backed film. Conveniently, the receptor layer now allows Scotchprint™ graphics to be applied to plasticized polyvinyl chloride coated fabric for use on soft-sided vehicles.

Advantageously, the final graphic image article, that is, the imaged receptor layer on the crack resistance pressure sensitive adhesive backed film, together with any appropriate protective clear coat, applied to a plasticized polyvinyl chloride-coated fabric siding will withstand extreme environmental stresses that occur on soft-sided vehicles, particularly at low temperatures, that present Scotchprint™ materials do not withstand.

DESCRIPTION OF THE PREFERRED EMBODIMENT

An image is generally applied to the inventive receptor layer by thermally bonding electrostatic toners that were previously printed onto a transfer media as described for example in U.S. Pat. Nos. 5,114,520 and 5,262,259 and such description is incorporated herein by reference. After cooling, the receptor coated marking film can be separated from the transfer media and the toners are retained by the receptor coated marking film.

Preferably, the final graphic image article withstands the following tests:

(1) coating adherence; and (2) crack resistance at −20° C.

When the final graphic image article is comprised of more than one panel, for example, side-by-side panels with overlapping seams or one panel partially or totally adhered over another panel, then the final graphic imaged article preferably withstands the following additional test: (3) overlap adherence of one layer of imaged film to an underlying layer of imaged film.

A "panel" is defined as a sheet of an imaged receptor layer on a crack resistance pressure sensitive adhesive backed film, which may or may not include an appropriate protective clear coat.

"Coating adherence" is defined as achieving a 4B or 5B rating per ASTM test D3359, Test Method B after 16 hours of water immersion, whereby the sample is immediately tested after removal from the water and towel drying "Crack resistance" is defined as minimum damage to the surface after repeated flexing and preferably after 4000 double flexes in a flex tester operating at −20° C. per DIN 53359 Test B. "Overlap" adherence is determined in accordance with ASTM D1000, except that the imaged film to be tested is adhered to a like portion of imaged film that has been adhered to PVC-coated fabric substrate. This multilayer composite, that is, where at least two panels overlap each other, is aged at least 16 hours at 65° C. prior to testing. The overlap adherence is preferably at least 1.0 pounds per inch width for all colors and non-colored portions.

Marking films having a urethane base, such as Scotchcal™ 190 marking film, are used on plasticized polyvinyl chloride coated fabrics. While urethane based films have outstanding crack resistance, plasticizer resistance and moisture resistance, standard Scotchprint™ receptor coatings do not work on urethane based or other crack resistant marking films.

When electrostatic toner receptor coatings used on conventional vinyl chloride based marking films are applied to crack resistant films used for marking soft sided vehicles, such coated films fail to meet the crack resistance criteria and will often fail the coating adherence criteria. However, when a crack resistant film, such as a urethane-based film is coated with the inventive receptor, the coated film retains substantially all of the properties of the base film without such a coating and more importantly, the coated film meets the above performance criteria. Using urethane-based films without any receptor coating generally is unacceptable for imaging by toner transfer because hot lamination results in no release from untoned areas and poor overlap adhesion in toned areas.

It is well known that the flexibility of thermoplastic coatings can be increased by adding plasticizer. The flexibility of the coatings used for vinyl film at room temperature can be partially attributable to plasticizer. Increased levels of plasticizer have been shown to improve crack resistance at low temperatures. However, with higher plasticizer loading, particularity in an acrylic-containing coating, the surface can become tacky at normal handling temperatures. This surface tack can cause handling difficulties, dirt pickup, less abrasion resistance, poorer internal strength, image delamination, and roll blocking problems.

Publicly known flexible polyvinyl chloride substrates typically contain high levels (60 to 100 parts per hundred parts resin) of monomeric plasticizer. This monomeric plasticizer tends to migrate into any graphic marking film adhered to the surface, thus resulting in the same types of problems associated with addition of excess plasticizer.

It has been discovered that a receptor coating composition comprising a blend of acrylic resin, a vinyl resin, a solution or dispersion grade rubber, and a plasticizer coated onto a urethane-based film will meet the performance criteria, while minimizing plasticizer influence at normal handling temperatures. Preferably, the receptor coating composition has at least 5% to 55% of a solution or dispersion grade rubber, more preferably, 7% to 30% of a solution or dispersion grade rubber. It is within this range that the resultant printed graphic meets crack resistance criteria.

Once the electrostatic toner receptor coating has been applied to a crack resistant film, a toner image can then be thermally transferred onto this receptor layer. A wear coat, protective layer or clear coat can then be applied by technique known to those skilled in the art, such as screen printing clear coats, or flood coating clear coats.

Furthermore, it has been found that incorporation of a graphics overlay composite (a premask layer adjacent to a protective layer), as described, for example in Ser. No. 08/178,644, field Jan. 7, 1994, now abandoned, assigned to the same assignee as the present application, can enhance the overlap adhesion of finished graphic image panels.

Particularly useful acrylic resins for the image receptor coating include methyl methacrylate polymers and copolymers, such as Acryloids B-44 and B-48, commercially available from Rohm and Haas, and a methyl methylacrylate/ethyl acrylate/N-t-butylacrylamide. Particularly useful vinyl resins for the image receptor coating including vinyl chloride/vinyl acetate copolymers, such as those commerically available from Union Carbide, under the trade designation "UCAR". Any dispersion or solution grade rubber can be used in the present invention and suitable examples include but are not limited to solution chlorinated rubbers (such as, epichlorohydrin rubber commerically available as Hydrin CG from Zeon Chemicals) and urethane dispersion rubbers (such as NeoPac™ R-9000 available from Zeneca Chemical).

Objects and advantages of this invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

| Glossary | |
|---|---|
| A11 | a methyl methacrylate polymer commerically available from Rohm & Haas under the trade designation "Acryloid A-11" |
| B44 | a methyl methacrylate copolymer commercially available from Rohm & Haas |

-continued

| Glossary | |
|---|---|
| Aromatic 150 | a petroleum naphtha aromatic solvent containing 98% C8+ aromatics, tagged closed cup flash point of 150° C. commercially available from Exxon Chemical |
| Hydrin CG ™ 70 rubber | a solution epichlorohydrin rubber commerically available from Zeon Chemicals |
| MMA/EA/t-BAM terpolymer | Methyl methacrylate(CAS#80-62-6)/ethyl acrylate (CAS#140-88-5)/N-tert-butylacrylamide; 55/20/25 ratio, 40.88% solids in MEK, Brookfield viscosity 7120 cps. with LV4 @ 60 rpm, Mw of 186,326, polydispersity, Mw/Mn = 3.7479 (based on one lot). Monomers available from Aldrich Chemical. |
| NeoPac ™ R-9000 | an aliphatic polyurethane-acrylic latex copolymer dispersion rubber commercially available from Zeneca with a Sward hardness of 36 and a free film elongation of 620% |
| Palatinol 711-9 | a C7–11 phthalate ester plasticizer commerically available from BASF |
| UCAR 525 | a 54% solids acrylic-vinyl chloride modified latex commerically available from Union Carbide |
| Uniflex 312 | a plasticizer commerically available from Union Camp |
| VAGH | a hydroxyl functional vinyl chloride/vinyl acetate terpolymer commerically available from Union Carbide under the trade designation "UCAR VAGH" |
| VYES | a hydroxyl functional vinyl chloride/vinyl acetate terpolymer commerically available from Union Carbide under the trade designation "UCAR VYES" |
| VYHH | a vinyl chloride/vinyl acetate copolymer available from Union Carbide under the trade designation "UCAR VYHH" |
| VYNC | a vinyl chloride/vinyl acetate copolymer available from Union Carbide under the trade designation "UCAR VYNC"-40% solids in isopropyl acetate as supplied |

Vinyl Characteristics

| Resin | Vinyl Chloride | Vinyl Acetate | Hydroxyl | Inherent Viscosity[1] | $T_g$ (° C.) | Average Mw |
|---|---|---|---|---|---|---|
| VAGH | 90% | 4% | 2.3% | 0.53 | 79 | 23,000 |
| VYES | 67% | 11% | 3.0% | 0.15 | 40 | 4,000 |
| VYHH | 86% | 14% | 0% | 0.50 | 72 | 20,000 |
| VYNC | 60% | 32% | 0% | 0.32 | 51 | 12,000 |

[1]ASTM D-1243

Acrylic Characteristics

| Acrylic | $T_g$ (° C.) | Hardness (KHN) | Chemical Composition |
|---|---|---|---|
| A-11 | 100 | 18–19 | MMA polymer |
| B-44 | 60 | 15–16 | MMA copolymer |

EXAMPLES

Example 1

A receptor coating was prepared by blending the components in the amounts summarized in Table 1. This blend was then coated onto a pressure sensitive adhesive backed film consisting essentially of titanium dioxide, Zeneca Chemicals R-9000, and Zeneca Chemicals R-962 in proportions of 33/41/26. Coating weight of the receptor layer was 19.4 grams/ square meter. This coated film was imaged and passed the coating adherence and crack resistant tests.

TABLE 1

| Amount Used (lb.) | Component |
|---|---|
| 11.49 | MMA/EA/t-BAM terpolymer |
| 37.97 | methyl ethyl ketone (MEK) |
| 14.65 | toluene |
| 13.80 | VYNC |
| 5.52 | VYHH |
| 5.17 | Hydrin CG ™ 70 rubber |
| 11.40 | Palatinol 711-9 |

Example 2

A receptor coating was prepared by blending the components in the amounts summarized in Table 2. This blend was then coated onto a pressure sensitive adhesive film consisting essentially of titanium dioxide, Miles Bayhydrol™ 123, and Zeneca Chemicals R-9000 in proportions of 33/45/22. Coating weight of the receptor layer was 19.4 grams/ square meter. This coated film was imaged and passed the coating adherence and crack resistant tests. Table 5 summarizes the film properties of the Zeneca and Miles products.

TABLE 2

| Amount Used (lb.) | Component |
|---|---|
| 4.28 | Rohm & Haas B-44 |
| 52.75 | methyl ethyl ketone (MEK) |
| 10.32 | toluene |
| 12.56 | VYNC |
| 5.02 | VYHH |
| 4.70 | Hydrin CG ™ 70 rubber |
| 10.37 | Palatinol 711-P |

Example 3

A clear coat/premask was prepared by coating a premask backing of a paper having a basis weight of 94 lbs per ream (3000 sq. ft.) with high density polyethylene on both sides (13 lbs. on gloss side and 11 lbs. on matte side, commercially available from HP Smith) first with a layer consisting essentially of the formulation described in Table 3 and secondly with a layer as described in Table 4. The first layer was coated to yield a dry coating weight of 4.5 grams/sq. meter. The second layer was coated to yield a dry coating weight of 10.3 grams/sq. meter.

TABLE 3

| Amount Used (lb.) | Component |
|---|---|
| 19.5 | Acryloid A-11 |
| 60.0 | MEK |
| 4.9 | VAGH |
| 13.4 | Uniflex 312 |

TABLE 4

| Amount Used (lb.) | Component |
|---|---|
| 10.0 | VYES |
| 42.7 | MEK |
| 38.2 | toluene |
| 6.1 | Hydrin CG ™ 70 rubber |
| 3.3 | Palatinol 711-P |

TABLE 5

| Film Components Physical Properties | | | |
|---|---|---|---|
| Product | NeoPac ™ R-9000 | NeoRez ™ R-962 | Bayhydrol ™ 123 |
| Tensile (psi) | 4000 | 3500 | 5000 |
| Elongation (%) | 620 | 800 | 350 |
| 100% Modulus (psi) | 2000 | 900 | 800 |

The material from Example 2 (having a pressure sensitive adhesive layer protected by a release liner) was placed in contact with the aforementioned premask/clear coat and passed through a hot roll laminator operating as follows: one-9" steel roll, one-9" rubber roll with a 58 Shore D hardness, with a nip pressure of 55 pounds per lineal inch, and with a speed of 46 centimeters per minute. The resulting composite was adhered to a flexible polyvinyl chloride coated fabric by (1) removing the liner protecting the pressure sensitive adhesive, (2) placing the adhesive in contact with the polyvinyl coated fabric, (3) adhering the graphic to the flexible polyvinyl coated fabric by pressing the pressure sensitive adhesive firmly against the polyvinyl coated fabric, and (4) removing the premask backing thus leaving the finished graphic with a clear coating on the flexible polyvinyl coated fabric. This coated film was imaged and tested and met the three performance criteria.

Example 4

A clear coat/premask is prepared by coating a premask backing of 2 mil polyester first with a layer consisting essentially of the formulation as described in Table 3 and secondly with a layer as described in Table 4. The first layer is coated to yield a dry coating weight of 4.5 grams/sq. meter. The second layer is coated to yield a dry coating weight of 10.3 grams/sq. meter. The material is laminated as described in Example 3 and tested as described in Example 1. This coated film was imaged and tested and met the three performance criteria.

Example 5

A receptor coating was prepared by blending the components in the amounts summarized in Table 6. This blend was then coated onto a pressure sensitive adhesive backed film consisting essentially of titanium dioxide, Zeneca Chemicals R-9000, and Zeneca Chemicals R-962 in proportions of 33/41/26. Coating weight of the receptor layer was 19.4 grams/ square meter. This coated film was imaged and tested and met the three performance criteria.

TABLE 6

| Amount Used (lb.) | Component |
|---|---|
| 79.5 | UCAR 525 |
| 10.0 | NeoPac ™ R-9000 |
| 10.0 | Uniflex 312 |
| 0.5 | Glycoloxypropyltrimethoxysilane |

The coated article was clear coat screen printed using 230 mesh screen, with a one (1) pass coating, and then oven-dried for 10 minutes at 150° F. The clear coat composition was diluted with cyclohexan one to a viscosity of 700 centipoise, using a Brookfield viscometer, LV-2, RPM-60. The clear coat consisted essentially of the following composition:

TABLE 7

| Amount Used (lb.) | Component |
|---|---|
| 21.7 | Cyclohexanone |
| 17.6 | Ethyl ethoxypropianate |
| 9.5 | Butyl cellusolve acetate |
| 12.2 | Aromatic 150 |
| 20.1 | A-11 |
| 5.1 | VAGH |
| 13.8 | Uniflex 312 |

Various modifications and alterations of this invention will become apparent to those skilled in the art without departing from the scope and principles of this invention, and it should be understood that this invention is not to be unduly limited to the illustrative embodiments set forth hereinabove. All publications and patents are incorporated herein by reference to the same extent as if each individual publication or patent was specifically and individually indicated to be incorporated by reference.

We claim:

1. A graphic article comprising an electrostatic toner receptor layer adhering to a first major surface of a crack resistant film, wherein the electrostatic toner receptor layer comprises a blend of an acrylic resin, a vinyl resin, a solution or dispersion grade rubber and a plasticizer.

2. The graphic article according to claim 1 further including a pressure sensitive adhesive layer adhering to a second major surface of the crack resistant film, wherein the second major surface is opposed to the first major surface.

3. The graphic article according to claim 1 wherein the acrylic resin is a terpolymer of methyl methacrylate/ethyl acrylate and N-t-butyl acrylamide.

4. The graphic article according to claim 1 wherein the article further includes an imaged layer overlaying the toner receptor layer.

5. The graphic article according to claim 4 wherein the article further includes a clear coat layer overlaying the imaged layer.

6. The graphic article according to claim 5 wherein the clear coat layer is a graphic overlay composite, wherein the graphic overlay composite comprises a premask layer adjacent to a protective layer.

* * * * *

UNITED STATES PATENT AND TRADEMARK OFFICE

CERTIFICATE OF CORRECTION

PATENT NO. : 6,322,874 B1
DATED : November 27, 2001
INVENTOR(S) : Ronald S. Steelman et al.

It is certified that error appears in the above-identified patent and that said Letters Patent is hereby corrected as shown below:

Column 3,
Line 2, please delete "particularity" and insert therefore -- particularily --.

Column 6,
Line 64, please delete "cyclohexan one" and insert therefore -- cyclohexanone --.

Signed and Sealed this

Twenty-first Day of May, 2002

*Attest:*

JAMES E. ROGAN
*Director of the United States Patent and Trademark Office*

*Attesting Officer*